inett et al.

United States Patent [19]
Robinett et al.

[11] Patent Number: 5,917,111
[45] Date of Patent: *Jun. 29, 1999

[54] METHOD OF MANUFACTURING CITRIC ACID CHELATES

[75] Inventors: Alan M. Robinett; Carl Schauble, both of Ozark, Ala.

[73] Assignee: Frit, Inc., Ozark, Ala.

[ * ] Notice: This patent is subject to a terminal disclaimer.

[21] Appl. No.: 09/045,031

[22] Filed: Mar. 20, 1998

Related U.S. Application Data

[63] Continuation of application No. 08/755,236, Nov. 22, 1996, Pat. No. 5,772,723.

[51] Int. Cl.$^6$ ..................................................... C05F 11/00
[52] U.S. Cl. ................................................................ 71/27
[58] Field of Search ........................... 71/27, 64.11, 903, 71/904, DIG. 2

[56] References Cited

U.S. PATENT DOCUMENTS

| | | | |
|---|---|---|---|
| 4,425,149 | 1/1984 | Kimbro | 71/64.11 |
| 5,772,723 | 6/1998 | Robinett et al. | 71/27 |

OTHER PUBLICATIONS

Mortvedt, John J., "A look at three ways to apply Micronutrients with granular fertilizers," The world of micronutrients 1977, reprinted from Mar. issue of Custom Applicator.

Mortvedt, John J., "Micronutrient Recommendations and Choices of Materials for Application," Proceedings of the Fertilizer Industry Roundtable, 37$^{th}$ Annual Meeting, New Orleans, Louisiana, Nov. 2–4, 1987, pp. 128–132.

Mortvedt, J.J., "Micronutrients in Crop Production," Reprinted from Soil and Crop Science Society of Florida, Proceedings, vol. 47, Oct. 20–22, 1987, pp. 5–8.

Mortvedt, John J., "Micronutrients in the Fertilization of Crops," National Fertilizer Development Center, Tennessee Valley Authority, Muscle Shoals, Alabama 35660 (date unknown).

"NFSA Additives Handbook," National Fertilizer Solutions Association, 8823 North Industrial Road, Peoria, Illinois 61614, 1979 edition, pp. 69–160.

"Introducing a new line of micronutrients" brochure © 1996 Nortrace, Ltd., Greeley, Colorado 80631–5852.

"Citriplex 20% Copper" label © 1996 Nortrace, Ltd., Greeley, Colorado 80631–5852.

"Citriplex 20% Iron" label © 1996 Nortrace, Ltd., Greeley, Colorado 80631–5852.

"Citriplex 20% Manganese" © 1996 Nortrace, Ltd., Greeley, Colorado 80631–5852.

"Citriplex 20% Zinc" © 1996 Nortrace, Ltd., Greeley, Colorado 80631–5852.

*Primary Examiner*—Wayne Langel
*Attorney, Agent, or Firm*—Carol W. Burton, Esq.; Holland & Hart LLP

[57] ABSTRACT

A method of manufacturing a water soluble composition adapted for subsequent solubilizing and application to agricultural crops is disclosed in which a divalent metal salt, citric acid and sodium citrate are mixed to form a mixture having a moisture content of from approximately 10% to 1.25% percent by weight. The mixture is then processed in a drying environment to produce a product which is partially chelated and has a moisture content which is less than the moisture content of the mixture prior to processing. The preferred drying environment is from 120° F., to 150° F. Most preferably, the processing step is performed in a continuous flow, fluidized bed dryer at from approximately 120° F. to 150° F. for from approximately 50 seconds to approximately 70 seconds. Preferred divalent metals are iron, copper, zinc and manganese.

31 Claims, No Drawings

METHOD OF MANUFACTURING CITRIC ACID CHELATES

The present application is a continuation of U.S. patent application Ser. No. 08/755,236 filed Nov. 22, 1996, U.S. Pat. No. 5,772,723, which is hereby incorporated by reference from which priority under 35 U.S.C. § 120 is hereby claimed.

FIELD OF THE INVENTION

This invention relates to chelated metals having particular utility as plant micronutrients. More particularly, this invention relates to a method of manufacturing chelated metals for subsequent pre- or postemergent application to agricultural crops, either alone or in combination with other fertilizing material.

BACKGROUND OF THE INVENTION

Micronutrients are those nutrients which are essential for plant growth but which are required in amounts which are typically less than that required for macronutrients such nitrogen, phosphorus and potassium. The seven micronutrients commonly understood to be necessary for plant growth are boron, chlorine, copper, iron, manganese, molybdenum and zinc. Cobalt, calcium, magnesium and sulfur may also be required in smaller amounts, and are variously classified as micronutrients or secondary nutrients. As used herein, the term micronutrients includes secondary nutrients.

The constituent elements of micronutrients must be presented to plants in a form suitable for plant uptake, translocation and assimilation. One way in which certain micronutrient metals have been successfully applied to and utilized by plants is by application of metal chelate solutions. The term chelate is from the Greek for claw, and describes a "complex" in which organic molecules form ring-like structures through coordinate bonds with metal ions. The metal chelate structure loosely ties up the constituent metal ion(s) in a form in which the metal component is less likely to dissociate or participate in chemical reactions when the chelate is in the soil or in solution with other fertilizers. This allows the chelated metal to remain available until after the product penetrates and translocates within plant.

Chelated metals are currently available in the fertilizer industry in powder and liquid forms. Each form has certain disadvantages, however, and both forms tend to be more expensive than inorganic metal compounds. For example, aqueous metal chelate formulations typically are supplied in 2.5 or five gallon plastic jugs containing from 5% to 9% by weight of the chelated metal. Cost of shipping these products is high, primarily because of the relatively low weight percent of the chelated metal in the product as compared to the volume of water in which the metal chelate is dissolved. In addition, if temperatures drop below 32° F. some metal chelates crystallize out of liquid formulations and concentrate at the bottom of the container. Naturally this creates problems when subsequently applying the metal chelate solution to crops.

Not only does the bulkiness of the containers pose a storage space problem for some growers or fertilizer dealers, disposal of the plastic jugs can be problematical because many landfills no longer accept these containers because of container bulkiness and contamination issues. To address problems associated with use of plastic jugs, growers crops for which metal chelate requirements are substantial may choose to buy aqueous metal chelates solutions in bulk and place the liquids in large tanks or other storage vessels. However, to avoid accidental spillage when using such storage vessels, individual storage vessels are preferably placed in a lined dike having a capacity 110% of the volume of the largest storage vessel. This technique involves substantial cost to the grower or fertilizer dealer, and does not obviate crystallization problems of metal chelate solutions at lower temperatures.

While powder metal chelates are available and solve some of the stability, storage and disposal problems associated with metal chelate solutions, other problems remain unaddressed. For example, to produce certain powdered metal chelates, constituents are reacted in an aqueous solution and then dried, a process requiring substantial time, energy and expense. Powdered metal chelates produced in this manner include ethylene diamine tetraacetic acid (EDTA) chelates and lignin sulfonate- based metal chelates. While these powdered metal chelates can provide the constituent metal in greater concentration than metal chelate solutions, (e.g., 6% to 15% weight percent), powdered metal chelates are substantially more expensive, e.g., $1.50 to $8.00 per pound. The high cost of these products tends to limit their use to the horticulture industry.

Furthermore, some metal chelates solutions are decomposed by acid. The constituent metals may then exhibit reduced agronomic effectiveness. Thus, mixing some metal chelate solutions, including reconstituted powdered metal chelates, with certain acidic fertilizers must be avoided prior to application of the metal chelate solution to plants. Yet application of micronutrients with macronutrient fertilizers is typically preferred, because it provides a way to more evenly distribute a small micronutrient volume over a large target acreage.

It is against this background that the significant improvements and advancements of the present invention have taken place.

OBJECTIONS OF THE INVENTION

It is the principal object of the present invention to provide agricultural micronutrients in a form which is economical to transport and in containers with minimal disposal problems.

It is another object of the present invention to provide agricultural micronutrients in a form which may be combined with other fertilizer materials to create a stable composition in which the agronomic effectiveness of the micronutrients and the fertilizer material is maintained.

It is a further object of the present invention to manufacture agricultural micronutrients in a manner which does not require the removal of substantial amounts of water during processing and which has a shortened processing time over the processing time required to produce powdered EDTA metal chelates.

SUMMARY OF THE INVENTION

In accordance with its major aspects, a method of manufacturing a composition specially adapted for subsequent solubilizing and application to agricultural crops is disclosed. The method of the present invention includes the steps of mixing a divalent metal salt, citric acid and sodium citrate to obtain a mixture having a moisture content most preferably of from approximately 10% to 1.25% by weight. The mixture is then processed in a drying environment to obtain a product which is partially chelated and which has a moisture content less than that of the mixture prior to processing. The preferred drying environment has a temperature of from approximately 120° F. to approximately 150° F. The mixture is preferably maintained in this drying environment for from approximately 50 seconds to approximately 70 seconds, with the resulting product having a preferred moisture content of from approximately 5% to approximately 0.25% or less by weight of the final product, most preferably 1.25% to 0.5%. After processing in the drying environment, the product may be ground to reduce its average particle size. Thereafter, the ground product is placed in a container and hermetically sealed for shipment, and subsequent solubilization and use. The divalent metal of the divalent metal salt employed in the manufacturing method of the present invention is preferably selected from the group consisting of iron, copper, zinc and manganese.

A water soluble composition adapted for subsequent solubilizing and application to agricultural crops includes a partially chelated mixture of a divalent metal salt, citric acid and sodium citrate. The partially chelated mixture has a preferred moisture content of 1.25% or less by weight of the mixture. The divalent metal of the divalent metal salt employed in the manufacturing method of the present invention is preferably selected from the group consisting of iron, copper, zinc and manganese.

A more complete appreciation of the present invention and its scope can be obtained from the following detailed description of presently preferred embodiments of the invention, and the appended claims.

DETAILED DESCRIPTION OF THE INVENTION

It has been discovered that by utilizing the method of manufacturing described below, a partially chelated citric acid product having a relatively low moisture content can be formed which may be stored for extended periods of time with minimal risk of degradation, further chelation or crystallization. The partially chelated citric acid products so produced are particularly suitable, after subsequent controlled hydration, for application as micronutrients to crops, either alone or in combination with other fertilizer material.

The preferred manufacturing method of the present invention initially involves the mixing of three primary reactants: (1) a divalent metal salt, (2) citric acid, and (3) sodium citrate, and the placement of this mixture in a drying environment. Prior to placement in the drying environment, the mixture preferably has a moisture content, by weight, of from approximately 10% to approximately 1.25%, with the most preferred moisture content, by weight of the total mixture, of from approximately 1.5% to approximately 1.25%. The primary reactants are preferably supplied to the mixture in molar ratios of 3:1:1 of divalent metal salt, citric acid, and sodium citrate, respectively. The preferred divalent metals are iron, copper, manganese and zinc. Suitable metal salts include sulfates, nitrates and phosphates.

The mixture is then heated in a controlled drying environment, producing a partially chelated product which has a total moisture content less than that of the mixture. The preferred moisture content of the partially chelated product, by weight, is from approximately 5% to 0.25%, with the most preferred moisture content of the final product, by weight, from approximately 1.25% to approximately 0.5%.

When a divalent metal sulfate is employed in the present invention, the equilibrium reaction established in the drying environment is: $3M'SO_4+H_3C_6H_5O_7+Na_3C_6H_5O_7]M_3(C_6H_5O_7)+3Na^++3H^++3SO_4^=$ Essentially, controlled dehydration and partial chelation of the mixture occurs in the drying environment, and a partially chelated citric acid product is produced thereby.

More particularly, Examples I–IV below describe the production of copper, zinc, iron and manganese citric acid products, respectively, which are partially chelated in accordance with the methods of the present invention. It should be noted that in addition to including the three primary reactants identified above, two secondary reactants are also added to the mixtures described in each example. Sodium tripolyphosphate is added as a wetting agent to the mixture in an amount equal to approximately 0.1% by weight of the final mixture. Monopotassium phosphate is added to condition the mixture, in an amount equal to approximately 2.5% by weight of the final mixture.

EXAMPLE I 1,600 pounds of copper sulfate salt (approximately 25% by weight copper), 180 pounds of citric acid dry soluble 80% active ingredient (AI), 180 pounds of sodium citrate dry soluble 80% AI, 4 pounds of dry sodium tripolyphosphate, and 36 pounds of dry monopotassium phosphate (0-52-34) were mixed, with the total moisture content of the mixture preferably from approximately 1.5% to approximately 1.25% by weight of the mixture. The copper sulfate mixture was then placed on a continuous flow, fluidized bed drying operated in a temperature range of from approximately 120° F. to approximately 150° F., which constituted a drying environment for the mixture. The mixture was maintained in the drying environment for from approximately 50 seconds to approximately 70 seconds, during which time the moisture content of the resulting product was reduced to approximately 0.5% by weight of the product, and the product was partially chelated. The resulting product, which included copper citric acid chelate, was dry and friable. The product was allowed to cool and stabilize, and thereafter was introduced into a high speed mill to reduce particle size of the product and to reduce the tendency of the product to agglomerate. The ground product was then placed in containers, for example, plastic packages of 8 mil or greater thickness, and hermetically sealed. The ambient environment in which the product was maintained after treatment in the fluidized bed and before hermetic sealing had a relative humidity of less than 50%.

EXAMPLE II 1,475 pounds of zinc sulfate salt (approximately 35% by weight zinc), 243 pounds of citric acid dry soluble 80% AI, 242 pounds of sodium citrate dry soluble 80% AI, 6 pounds of dry sodium tripolyphosphate, and 34 pounds of dry monopotassium phosphate were mixed, with the total moisture content of the mixture preferably from approximately 1.5% to approximately 1.25% by weight of the mixture. The zinc sulfate mixture was then placed on a continuous flow, fluidized bed drying operated in a temperature range of from approximately 120° F. to approximately 150° F. The mixture was maintained in this environment for approximately 50 seconds to 70 seconds, during which time the moisture content was reduced to approximately 0.5% by weight, and part of the zinc sulfate salt was reacted to form zinc citric acid chelate. The product was allowed to cool, and stabilize, and thereafter milled. The ground product was then placed in containers and hermetically sealed, as described above in Example I.

EXAMPLE III 1,350 pounds of iron sulfate salt (31% iron by weight), 200 pounds of citric acid dry soluble 80% AI, 200 pounds of sodium citrate dry soluble 80% Al, 6 pounds of dry sodium tripolyphosphate, and 244 pounds of dry monopotassium phosphate were mixed, with the total moisture content of the mixture preferably from approximately 1.5% to approximately 1.25% by weight of the mixture. The iron sulfate mixture was then placed on a continuous flow, fluidized bed drying operated in a temperature range of from approximately 120° F. to approximately 150° F. The mixture was maintained in this environment for approximately 50 seconds to 70 seconds, during which time the moisture content was reduced to approximately 0.5% by weight, and part of the iron sulfate salt was reacted to form iron citric acid chelate. The product was allowed to cool, and stabilize, and thereafter milled. The ground product was then placed in containers and hermetically sealed, as described above in Example I.

EXAMPLE IV 1,350 pounds of manganese sulfate salt (approximately 31% by weight manganese), 200 pounds of citric acid dry soluble 80% Al, 200 pounds of sodium citrate dry soluble 80% Al, 6 pounds of dry sodium tripolyphosphate, and 244 pounds of dry monopotassium phosphate were mixed, with the total moisture content of the mixture preferably from approximately 1.5% to approximately 1.25% by weight of the mixture. The manganese sulfate mixture was then placed on a continuous flow, fluidized bed drying operated in a temperature range of from approximately 120° F. to approximately 150° F. The mixture was maintained in this environment for approximately 50 seconds to 70 seconds, during which time the moisture content was reduced to approximately 0.5% by weight, and part of the manganese sulfate salt was reacted to form manganese citric acid chelate. The product was allowed to cool, and stabilize, and thereafter milled. The ground product was then placed in containers and hermetically sealed, as described above in Example I.

It has been discovered that the preferred products of the present invention are those manufactured in accordance with the procedures of Examples I–IV above, in which the mixture to be placed in the drying environment has a moisture content of 4% or less by weight. In contrast, when the finished product has a moisture content of 5% or more, the product tends to agglomerate after production and harden during storage. Product shelf life is reduced, and, in extreme cases, the hardened product cannot be solubilized and further chelation induced without regrinding the product. Also, the hardened product typically cannot be mixed with other fertilizer material without regrinding. Thus, it is preferred that the mixtures of the present invention have a total moisture content by weight not exceeding 4% and the final partially chelated product have a preferred moisture content by weight of from 0.25% to 3%, most preferably approximately 0.5%.

It has also been discovered that the preferred products of the present invention are those manufactured in accordance with the procedures of Examples I–IV above, in which the mixture to be placed in the drying environment having an ambient temperature of at least 101° F. Mixtures placed in a drying environment of 90° F. to 100° F. or less result in a partially chelated product which exhibits reduced solubility and reduced compatibility with some fertilizer materials. In addition, the product is susceptible to uncontrolled chemical reaction when the packaged product is stored in ambient temperature above 100° F., such as may be experienced in warehouses, truck trailers or other storage environments. Such uncontrolled chemical reactivity can result in destruction of product packaging and substantially reduced product shelf life. Thus, it is preferred that the mixtures of the present invention be treated in a drying environment of at least 101° F., preferably of from 101° F. to 190° F., and most preferably from approximately 120° F. to approximately 150° F.

It has also been determined that the manufacturing methods of the present invention have a limited degree of success when the mixtures described in Examples I–IV are maintained in a drying environment for at least 10 seconds and at most 30 minutes. It is preferred, however, that the mixtures be maintained in a drying environment for from 30 seconds to 5 minutes, with maintenance of the mixtures in a drying environment for approximately 50 seconds to approximately 70 seconds most preferred. Mixtures maintained in a drying environment for an excessive or insufficient period of time may have inconsistent moisture content and texture, and have a resultant reduction in shelf life, solubility and fertilizer compatibility.

Examples V–VIII below describe the solubilization and further chelation of the concentrated, partially chelated ground products manufactured above in accordance with Examples I–IV, respectively, to produce metal chelate solutions suitable for pre- or postemergent application to agricultural crops. In each of Examples V–VIII, the addition of water to the ground product results in the solubilization of the ground product and further chelation of the divalent metal of the particular divalent metal salt present in the ground product.

EXAMPLE V

Two and one half pounds of the partially chelated copper/citric acid product produced according to Example I were added to one gallon of water. The product was mixed until the resulting solution was clear.

EXAMPLE VI

Sixteen pounds of the partially chelated zinc/citric acid product produced according to Example II were added to 3 gallons of water. The product was mixed until the resulting solution was clear.

EXAMPLE VII

Two and one half pounds of the partially chelated iron/citric acid product produced according to Example III were added to 1 gallon of water. The product was mixed until the resulting solution was clear.

EXAMPLE VIII

Two and one half pounds of the partially chelated manganese/citric acid product produced according to Example IV were added to 1 gallon of water. The product was mixed until the resulting solution was clear.

To ascertain the solubility and stability in fertilizer solutions of the metal citric acid chelate solutions produced above in accordance with the preferred methods of the present, 25 grams of a partially chelated copper/citric acid mixture prepared in accordance with Example I was further chelated and dissolved in 83 grams of water to produce a copper/citric acid chelate solution (referred to in Table I as the "Chelate Solution"). Thereafter, 18 grams of each of 13 different fertilizer solutions was separately mixed with 1.7 grams of the Chelate Solution, and the resulting solution visually evaluated upon mixing and after two hours if any undesirable precipitation or crystallization occurred or other reaction products were produced. The evaluation results are summarized in Table I.

TABLE I

| FERTILIZER SOLUTION | SOLUBILITY IN CHELATE SOLUTION INITIALLY UPON MIXING | SOLUBILITY IN CHELATE SOLUTION AFTER 2 HOURS |
|---|---|---|
| 1. 25% urea solution (46-0-0) | Clear | Clear |
| 2. 32% urea-ammonium nitrate solution | Clear | Clear |
| 3. Potassium nitrate solution (13.8-0-46) | Clear | Clear |
| 4. Ammonium polyphosphate (10-34-0) | Clear | Clear |
| 5. Potassium chloride solution (0-0-62) | Clear | Clear |
| 6. Potassium hydroxide (0-0-75) | Dark flocculant | Top 95% of solution clear, with flocculant settled at bottom of container |
| 7. Calcium chloride solution (10% Ca) | Fine white precipitate | Top 95% of solution clear, with precipitate settled at bottom of container |
| 8. Phosphoric acid solution (0-0-80) | Clear | Clear |
| 9. Aqua ammonia solution (24-0-0) | Clear blue solution | Clear blue solution |
| 10. 2.5% P2O5-1.5% K20 solution (0-15-0) | insoluble at concentration | Insoluble at concentration |
| 11. Ammonium thiosulfate (12-0-0 and 26 S) | Clear | Clear |
| 12. 10% sodium lignosulfonate | Dark brown solution without precipitate or flocculant | Dark brown solution without precipitate or flocculant |
| 13. Calcium nitrate (17-0-0 and 24 Ca) | Fine white precipitate | Top 95% of solution clear, with precipitate settled at bottom of container |

By employing the methods of the present invention to manufacture a partially-chelated, citric acid product, complete solubilization and subsequent dehydration of the product during manufacture is not required. Substantial energy costs and the processing time associated with dehydration is successfully avoided. Indeed, by not first solubilizing the primary reactants to achieve chelation and then dehydrating the fully chelated product, large volumes of water are not required at the manufacturing site. In addition, because the partially chelated, citric acid products of the present invention do not contain substantial quantities of water, shipment costs associated with transport of micronutrient solutions are also avoided.

Moreover, the manufacturing methods and products of the present invention provide a micronutrient product which has a relatively high concentration of metal (approximately 20%–25% by weight), is economical to ship, requires less storage space than other metal chelates, and is easier to use in conjunction with other fertilizer materials. Storage problems associated with metal EDTA solutions, for example, crystallization, are minimized with the micronutrient products of the present invention. As described above, the partially chelated metal products produced in accordance with Examples I–IV described above do not appear to be susceptible to uncontrolled chelation, degradation or other reaction during storage at temperatures of up to 140° F. for limited periods. Container disposal problems also associated with metal EDTA solutions are also avoided with the micronutrient products of the present invention. The preferred plastic bags used to package the products as described above in Examples I–IV, can be recycled or landfilled.

Presently preferred embodiments of the present invention and many of its improvements have been described with a degree of particularity. It should be understood that this description has been made by way of preferred examples, and that the invention is defined by the scope of the following claims.

What is claimed is:

1. A method of manufacturing a water soluble composition adapted for subsequent solubilizing and application to agricultural crops, comprising the steps of:

mixing a divalent metal salt, citric acid and sodium citrate to obtain a nitrate-free mixture having a moisture content of from approximately 10% to 1.25% by weight; and processing the nitrate-free mixture in a drying environment to obtain a nitrate-free product which is partially chelated and has a moisture content less than that of the mixture prior to processing.

2. The method of claim 1 wherein the drying environment has a temperature of from approximately 120° F. to approximately 150° F.

3. The method of claim 1 wherein the drying environment has a temperature of from approximately 120° F. to approximately 150° F. and wherein the mixture processing step includes the step of:

maintaining the mixture in the drying environment for from approximately 50 seconds to approximately 70 seconds.

4. The method of claim 3 wherein the moisture content of the product is approximately 5% to approximately 0.25% by weight of the product.

5. The method of claim 1 wherein the moisture content of the product is approximately 1.25% to approximately 0.5% by weight of the product.

6. The method of claim 1 wherein the product has an average particle size and the method further comprises the steps of:

grinding the product to reduce the average particle size of the product;

placing the ground product in a container; and hermetically sealing the container.

7. The method of claim 1 wherein the divalent metal of the divalent metal salt is selected from the group consisting of iron, copper, zinc and manganese.

8. The method of claim 7 wherein the drying environment has a temperature of from approximately 120° F. to approximately 150° F.

9. The method of claim 7 wherein the mixture has a total moisture content of from approximately 1.5% to 1.25% by weight of the mixture and the partially chelated product has a total moisture content by weight of from approximately 0.5% to approximately 1.25% of the product.

10. The method of claim 9 wherein the product has an average particle size and the method further comprises the steps of:

grinding the product to reduce the average particle size of the product;

placing the ground product in a container; and hermetically sealing the container.

11. The method of claim 10 wherein method further includes the step of:

maintaining the mixture in the drying environment for from approximately 50 seconds to approximately 70 seconds.

12. The method of claim 7 wherein the moisture content of the product is from approximately 1.25% to approximately 0.5% by weight of the product.

13. The method of claim 1 wherein the drying environment has a temperature of from approximately 120° F. to approximately 150° F. and wherein the mixture processing step includes the step of:

processing the mixture in a continuous flow, fluidized bed drying for from approximately 50 seconds to approximately 70 seconds.

14. The partially chelated product produced in accordance with the process of claim 1, wherein the divalent metal is selected from the group consisting of iron, copper, zinc and manganese.

15. The partially chelated product of claim 14, wherein the partially chelated product has a moisture content of from 0.5% to 1.25%.

16. The partially chelated product of claim 14, wherein the mixture has a moisture content of from 1.25% to 5% by weight of the mixture.

17. A water soluble composition adapted for subsequent solubilizing and application to agricultural crops, consisting essentially of a nitrate-free partially chelated mixture of a divalent metal salt, citric acid and sodium citrate, wherein the partially chelated mixture has a moisture content of at most 1.25% by weight of the mixture.

18. The composition according to claim 17, wherein the divalent metal of the divalent metal salt is selected from the group consisting of iron, copper, zinc and manganese.

19. The composition according to claim 17, wherein the partially chelated mixture has a moisture content of at most 0.5% by weight of the mixture.

20. A method of manufacturing a water soluble composition adapted for subsequent solubilizing and application to agricultural crops, consisting essentially of the steps of:

mixing a divalent metal salt, citric acid and sodium citrate to obtain a nitrate-free mixture having a moisture content of from approximately 10% to 1.25% by weight; and processing the nitrate-free mixture in a drying environment to obtain a nitrate-free product which is partially chelated and has a moisture content less than that of the mixture prior to processing.

21. The method of claim 20 wherein the drying environment has a temperature of from approximately 120° F. to approximately 150° F.

22. The method of claim 20 wherein the drying environment has a temperature of from approximately 120° F. to approximately 150° F. and wherein the mixture processing step includes the step of:

maintaining the mixture in the drying environment for from approximately 50 seconds to approximately 70 seconds.

23. The method of claim 20 wherein the moisture content of the product is approximately 5% to approximately 0.25% by weight of the product.

24. The method of claim 20 wherein the moisture content of the product is approximately 1.25% to approximately 0.5% by weight of the product.

25. The method of claim 20 wherein the product has an average particle size and the method further comprises the steps of:

grinding the product to reduce the average particle size of the product;

placing the ground product in a container; and hermetically sealing the container.

26. The method of claim 20 wherein the metal of the metal salt is selected from the group consisting of iron, copper, zinc and manganese.

27. The method of claim 26 wherein the mixture has a total moisture content of from approximately 1.5% to 1.25% by weight of the mixture and the partially chelated product has a total moisture content by weight of from approximately 0.5% to approximately 1.25% of the product.

28. A water soluble composition adapted for subsequent solubilizing and application to agricultural crops, comprising a nitrate-free, partially chelated mixture of a divalent metal salt, citric acid and sodium citrate, wherein the partially chelated mixture has a moisture content of at most 1.25% by weight of the mixture.

29. The composition according to claim 28, wherein the divalent metal of the divalent metal salt is selected from the group consisting of iron, copper, zinc and manganese.

30. The composition according to claim 28, wherein the partially chelated mixture has a moisture content of at most 0.5% by weight of the mixture.

31. The composition according to claim 30, wherein the divalent metal of the divalent metal salt is selected from the group consisting of iron, copper, zinc and manganese.

* * * * *